United States Patent Office.

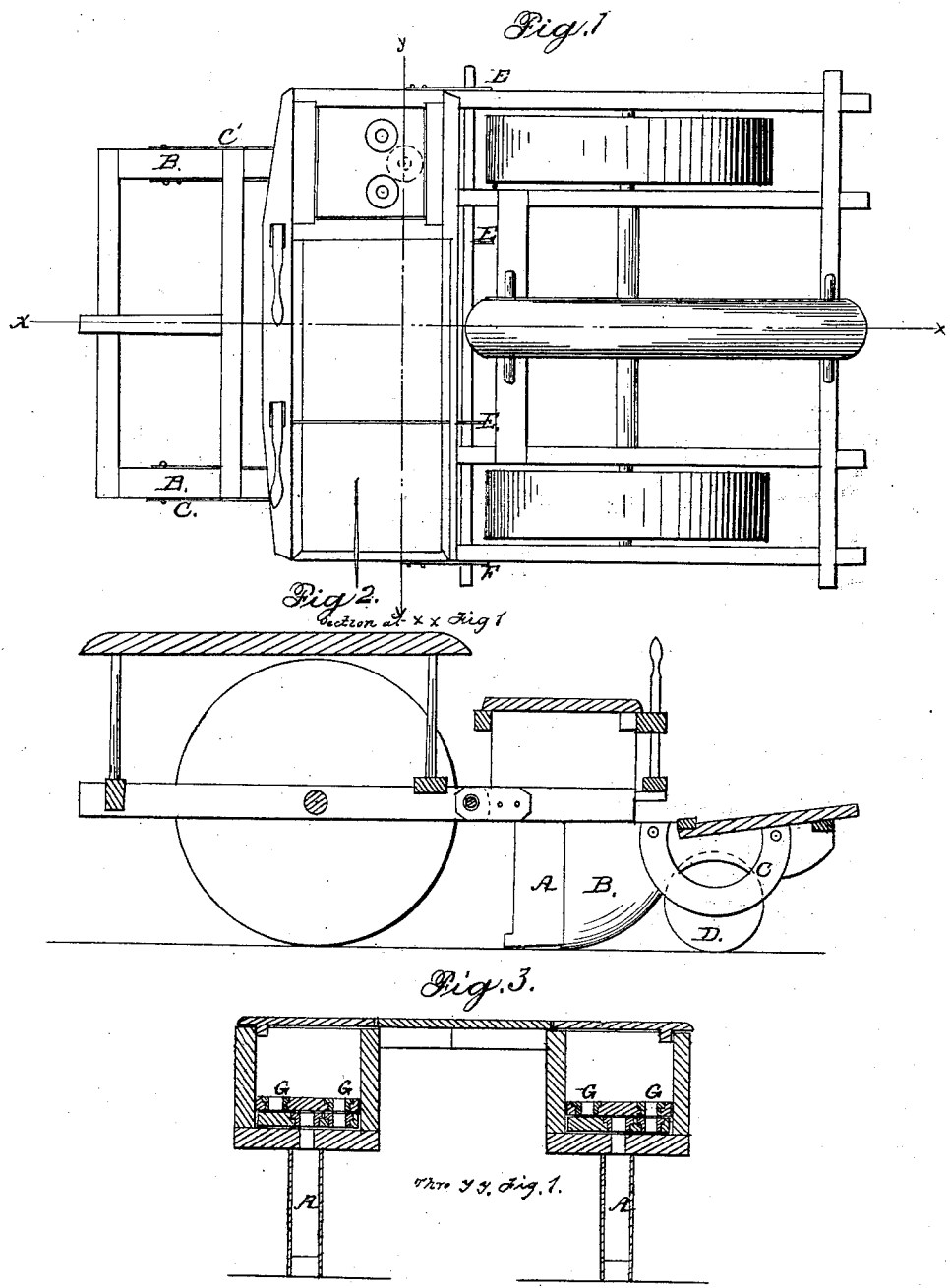

IMPROVEMENT IN CORN PLANTERS.

WILLIAM R. BUTLER, OF GREEN BUSH, ILLINOIS.

*Letters Patent No. 59,742, dated November 20, 1866.*

SPECIFICATION.

TO ALL WHOM IT MAY CONCERN:

Be it known that I, WILLIAM R. BUTLER, of Green Bush, in the county of Warren, and State of Illinois, have invented certain new and useful improvements in corn planters; and I do hereby declare that the following is a full, clear, and complete description of the same; reference being had to the annexed drawings making part of this specification, in which, Fig. 1 is a view of the top of the machine.

Fig. 2 is a section on the line marked X.

Fig. 3 is a section on the line marked Y.

In the different figures the same letters refer to identical parts.

The parts marked E represent the couplings by which the hinder portion or frame is connected with the seeding apparatus. Upon the upper portions or tops of the runners B, are situated the boxes F, containing the plates G. Each of these plates has two holes, as shown in the drawings, within which are placed the regulators $G^1$. I make these regulators of four different sizes—one set of seven-eighths of an inch, interior diameter, one set five-eighths of an inch diameter, one of half an inch, and one of three-eighths inch bore, to be used for different kinds of seed. They can be removed and introduced at pleasure. The upper plates are stationary, but the lower ones rotate upon pivots, and are moved by bar $H^1$ and levers H being connected with them. These levers rest in the mortises cut in the frame $H^2$.

A represents tubes extending from the holes in the bottoms of the boxes F to the ground, and are joined to the hinder portions of the runners B. A small portion of the rear of each of these tubes is left open, so that the corn may not be dragged along the ground after it has been dropped. The runners B have the supports C attached. Between these supports are situated the rolling cutters $C^1$, the axles of which revolve in supports. I represents the driver's seat. J represents the large running wheels, $J^1$ the axles of the large running wheels, and K denotes the frame of the machine.

This machine operates as follows: The corn having been placed in the boxes F, portions of it drop into the regulators $G^1$ of the upper plates G, and rest upon the lower plates. The bar $H^1$ and lever H are then moved, which, causing the rotation of the lower plates, bring one of the regulators in each of the lower plates directly under one of those in the upper plates, and the corn contained in the regulators drops into the lower ones mentioned. The levers H and bar $H^1$ are then moved in a contrary direction until the regulator in each of the lower plates is made to cover the hole in the bottom of each box where the corn is discharged, the other regulators in the meantime becoming filled. The runners B and rolling cutter having previously made the furrows into which the corn is dropped.

What I claim as my invention, is—

The combination, construction, and arrangement of the boxes F, plates G, regulators $G^1$, levers H, and bar $H^1$, substantially as and for the purpose represented.

WILLIAM R. BUTLER.

Witnesses:
    ROBERT <sub>his</sub> ⋈ <sub>mark.</sub> McHENRY,
    JAMES M. CLAVIS.